United States Patent [19]

Reed et al.

[11] 4,255,129

[45] Mar. 10, 1981

[54] APPARATUS AND METHOD FOR PROCESSING ORGANIC MATERIALS INTO MORE USEFUL STATES

[75] Inventors: Roger D. Reed; Elmer E. Reed, both of Washington County, Mo.

[73] Assignee: Thomas N. DePew, St. Louis, Mo.; a part interest

[21] Appl. No.: 56,513

[22] Filed: Jul. 11, 1979

[51] Int. Cl.³ .......................................... F27B 15/00
[52] U.S. Cl. ........................................ 432/13; 34/164;
110/258; 432/17; 432/80; 432/134; 432/162;
432/153; 432/164
[58] Field of Search ..................... 432/13, 17, 80, 134,
432/153, 162, 163, 164; 110/255, 258; 198/756;
34/164

[56] References Cited

U.S. PATENT DOCUMENTS

| | | | |
|---|---|---|---|
| 1,016,568 | 2/1912 | Landes | 34/164 |
| 1,773,959 | 8/1930 | Crow . | |
| 2,420,376 | 5/1947 | Johansson | 34/164 |
| 2,630,209 | 3/1953 | Carrier, Jr. . | |
| 2,983,051 | 5/1961 | Zimmermann et al. | 34/164 |
| 3,053,379 | 9/1962 | Roder et al. | 198/756 |
| 3,053,380 | 9/1962 | Spurlin . | |
| 3,084,450 | 4/1963 | Hansen | 34/164 |
| 3,154,621 | 10/1964 | Alban | 34/164 |
| 3,343,812 | 9/1967 | Moulton | 34/164 |
| 3,469,831 | 9/1969 | Beavers | 432/134 |
| 3,852,048 | 12/1974 | Pyle . | |
| 3,868,213 | 2/1975 | Shulika et al. | 432/134 |
| 3,875,077 | 4/1975 | Sanga . | |
| 3,901,766 | 8/1975 | Smith . | |
| 4,030,984 | 6/1977 | Chambers . | |

OTHER PUBLICATIONS

Rexnord Bulletin, No. 16501, "Processing With Vibration", Rexnor Vibrating Equipment Division, 3400 Fern Valley Road, Louisville, Kentucky, 40213 (1978), pp. 6 & 8, including front and rear cover pages.

Primary Examiner—John J. Camby
Attorney, Agent, or Firm—Kalish & Gilster

[57] ABSTRACT

A method for processing various organic materials such as lignocellulosics or biomass into more useful states, such as charcoal, carbon black, and coke, and other processed products while producing useful off-gases, includes feeding aggregate pieces of the material to a vertically extending heating chamber and, preferably, closing the chamber to air to control oxygen therein. The pieces are conveyed upwardly through the chamber in a predetermined time by spiral vibratory conveyor. The chamber is heated to a preselected temperature sufficient for gaseous conversion of volatile hydrocarbon constituents of the material. Resultant off-gases are removed from the chamber for further use such as burning thereof for heating the chamber or condensing volatiles, etc.

Apparatus for carrying out the method includes preferably first and second such chambers, there being continuous spiral vibrator tray in each chamber carried by a central, vertical support column. Vibration generators secured to the support column impart vibratory forces to the tray for conveying the material by vibratory action. Heating of the material is carried out in the first chamber preferably by burning off-gases generated therein. After heating, material is transferred to the second chamber, also closed to air, for cooling as pieces are carried by vibration along a spiral conveyor therein. If drying of material is desired to reduce moisture content prior to carbonization, the material may first be conveyed through another chamber, heated with combustion gases from heating of the first chamber, by vibratory action.

51 Claims, 9 Drawing Figures

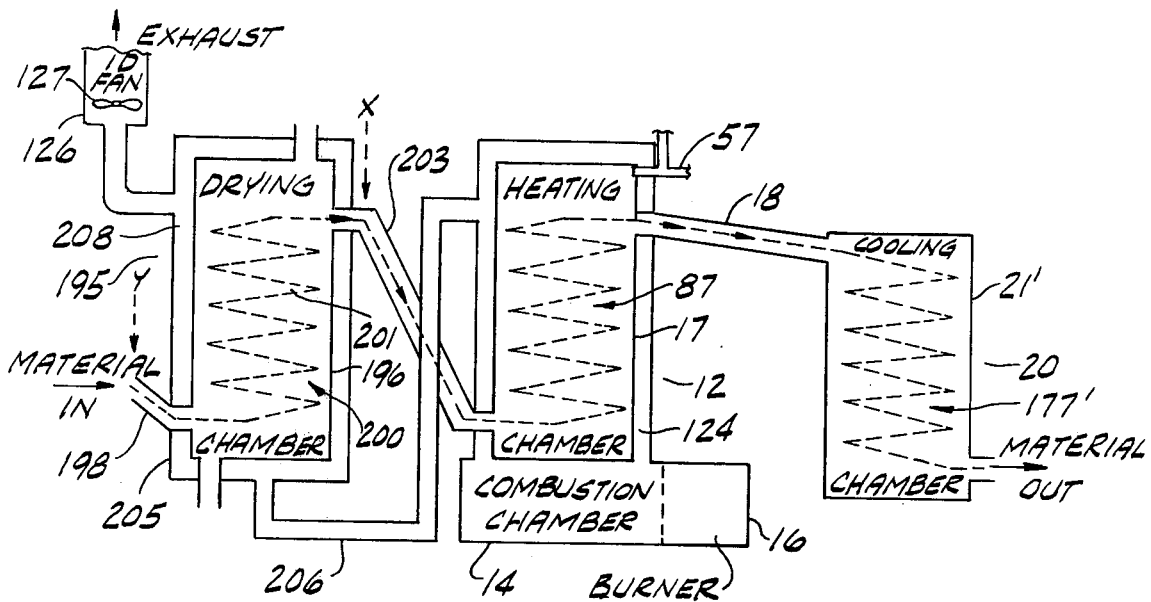

APPARATUS AND METHOD FOR PROCESSING ORGANIC MATERIALS INTO MORE USEFUL STATES

BACKGROUND AND SUMMARY OF THE INVENTION

This invention relates to processing of various organic or organic-bearing materials and more particularly to such processing by highly effective and energy efficient heating of the materials while confined under controlled conditions for converting materials into more useful states.

Heretofore, various apparatus has been proposed for the processing of materials by the use of head wherein the materials are either batch fed or continuously supplied to a retort, or heating vessel. For example, the carbonization of various organic materials, including the conversion of such materials into charcoal, has heretofore been carried out in either drum or cylindrical retorts of the type having the principal axis of the retort oriented either horizontally or at an angle to the horizontal.

Typically, one of two principal techniques is employed in these prior art arrangements to move material through the retort or vessel as it is heated. In a first approach, a screw, auger, worm or other conventional mechanical conveyor is used to physically carry the material along the length of the retort. In the other type of arrangement, the retort itself is mounted for being rotated, as upon rollers, and vanes or other projections within the retort are used to carry material along therein as the retort rotates, in the manner of a cement mixer. Both of these approaches suffer from a number of disadvantages, among which may be noted mechanical complexity and the use of complicated or expensive machinery which with all of the consequent and requisite shafts, gearing, chains, belts, transmissions or other conventional machinery used for imparting rotation either to the auger, or conveyor or to the retort itself.

Regardless of the objectionable nature of such burdensome, complicated and maintenance-requiring mechanical arrangements, it is also difficult to provide, within the confined space of the retort, a sufficient processing length for thorough exposure of materials to be heated as they travel through the retort. Furthermore, it has been exceedingly difficult, in any event, to provide through and uniform exposure of material to be processed in such prior art apparatus due to the fact that agglomerations of the material preclude exposure of at least some of the material to the heating environment, and due to various hot spots or temperature gradients within the retort or heating vessel, some of the material may be exposed to different temperatures than other parts of the material. The processing is, therefore, nonuniform and nonhomogeneous within the body of material.

Accordingly, an object of the present invention is the provision of improved apparatus and methods for processing of materials by heating, both organic and inorganic.

Another object of the present invention is the provision of novel apparatus and methods for processing of various organic materials, or materials containing organic constituents, into more useful forms, such as into carbon, charcoal, coke, carbon black, or into gaseous constituents thereof.

A further object of the invention is the provision of such apparatus and methods for producing extremely high quality charcoal or carbon from wood or other lignocellulosic materials, including forest products, such as wood waste, wood chips, sawdust, wood dust, bark, shavings, wood pellets, including various biomass materials including bagasse, grasses, various cuttings, crops and crop wastes, coffee grounds, leaves, straw, pits, hulls, shells, stems, husks, cobs, and waste materials including animal manure, and whereby such various materials are converted into one of the foregoing desired forms.

A still further object of the invention is the provision of such apparatus and methods which are capable of processing organic, as well as inorganic materials, which are in various aggregate, or bulk, forms including chips, small pieces, pellets, fragments, grains, particles, dust, shavings, powder, flakes, chunks, etc.

Another object of the invention is the provision of such apparatus and methods which can be used to obtain various industrial fuels, including low or high BTU gases usable as an industrial fuel, from such forest products or biomass materials.

Yet another object of the invention is the provision of such apparatus and methods for converting rubber tire scrap into carbon black or other high carbon converted material.

A further object of the invention is the provision of such apparatus and methods for processing of charcoal to obtain activated charcoal.

Yet another object of the invention is the provision of such apparatus and methods for making coke from coal.

A related further object of the invention is the provision of such apparatus and methods useful for gasifying coal.

A further object of the invention is the provision of such apparatus and methods for extracting kerogen, i.e., organic oil-yielding matter, from oil shales or bitumen from oil sands.

A still further object of the invention is the provision of such apparatus which can be used not only for heating, but also for drying and mixing, of various different materials.

Among other objects of the invention may be noted the provision of such apparatus which, in addition to being useful for the processing of various different materials and for carrying out various processes as hereinabove noted, which allows such materials to be exposed to a predetermined environment in a highly uniform manner; which permits heating of such materials in piece or particle aggregate form with extraordinary uniformity and controllability; which handles material pieces of various different sizes, mesh, grade and textures ranging from powders through large chunks, and which permits a very high degree of precision and control over a wide range of processing times and rates.

Among still other objects of the invention may be noted the provision of such apparatus which is relatively very compact while achieving the processing materials along a relatively very long path; which is highly efficient in operation, achieving processing of materials with a relative minimum of power, and with such low, almost miniscule power being used only for handling and transferring of materials to and from apparatus of the invention.

Additional objects include the provision of such apparatus and methods which do not require use of conventional rotating shafts, screws and augers; which obviate the use of maintenance-prone complicated or expensive machinery; which permit the use of a stationary processing chamber; and which allow processing along a vertical extent of the chamber.

Various other objects and features of the invention will be in part apparent and in part pointed out hereinbelow.

BRIEF DESCRIPTION OF THE DRAWINGS

FIG. 9 is a simplified schematic diagram of apparatus of the invention illustrating certain additional uses of the apparatus.

Corresponding reference characters indicate corresponding parts throughout the several views of the drawings.

DESCRIPTION OF THE PREFERRED EMBODIMENT

Figure 1:
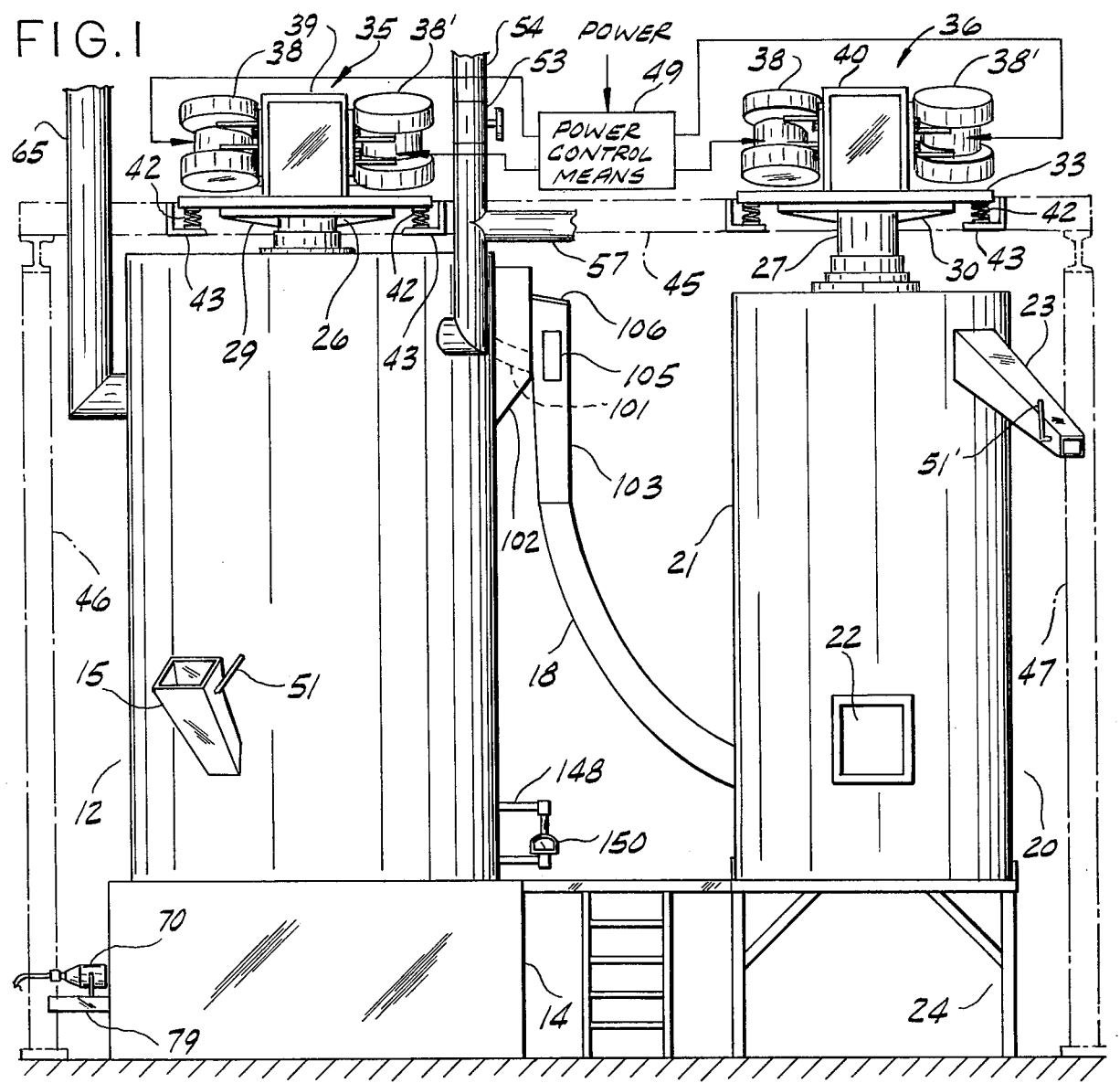
FIG. 1 is a front elevational view, partly in schematic form, illustrating a system constructed in accordance with and embodying the present invention and consisting of heating and cooling apparatus.

Referring now to the drawings, and particularly to FIG. 1, there is illustrated generally at reference numerall 11 a system or apparatus of the present invention for carrying out a method of processing various organic materials into more useful states by the process of heating of the materials for the purpose of converting volatile hydrocarbon constituents thereof to a gaseous state. Apparatus 11 comprises a cylindrical heating unit 12 below which is situated a combustion chamber 14 adapted for being fueled by combustible fuel gases, as more fully explained hereinbelow. Various kinds of organic (or conceivably also inorganic) material are supplied to heating unit 12 in aggregate form, i.e., as chips, small pieces, pellets, fragments, grains, particles, dust, shavings, powder, flakes, chunks, and the like, by means of a supply chute 15. The latter may be connected to a suitable hopper, bin, conventional conveyor or the like for conveying the aggregate or bulk material to chute 15 for being processed in heating unit 12.

Within heating unit 12 there is a heating chamber 17 (see FIG. 2) which is to be described in much greater detail hereinbelow. Materials fed through supply chute 15 are processed through a vertical extent of chamber 17, being conveyed therethrough in accordance with a novel arrangement, explicated hereinbelow, and are then delivered by means of a transfer chute 18 from the top of the heating unit to a point at the lower end of a cooling unit 20 having a cooling chamber 21.

In the cooling chamber, the materials are cooled while being maintained in the closed environment of cooling chamber 21 while being conveyed upwardly through a vertical extend of the latter by an arrangement similar to that employed in heating unit 11. The cooled materials, having been converted, or otherwise processed, are then delivered by a discharge or delivery chute 23 which may feed such materials into a suitable hopper or to a conventional conveyor for storage or further handling and processing. Cooling unit 20 is supported on a suitable platform 24 whereby the height of the cooling unit is commensurate with that of heating unit 11. A viewing port 22 in a front wall of cooling unit 20, permits observation of hot processed material being supplied by chute 23 to the cooling unit.

Generally speaking, heating unit 12 and cooling unit 20 each contain a vibratory conveyor, to be described fully hereinbelow, with such vibratory conveyor providing metal columns 26,27 projecting upwardly out of the units and carrying respective flanges 29,30 which are suspended from respective platforms 32,33 upon which are mounted vibratory units designated generally 35,36. Said units 35,36 are identical, each having a pair of electric motor units 38,38' secured to opposite sides of support structures 39,40 of the conveyor and which extend upward from the corresponding platforms 32,33 for imparting vibration thereto about the vertical axis of columns 26,27.

Said platforms 32,33 are each resiliently supported by springs 42 upon brackets 43 carried at their opposite ends by suitable beams as illustrated in phantom at 45. The beams are carried between posts 46,47. Thus, it will be seen that the weight of each of the vibratory units 35,36 is supported by the beam and post structure rather than the respective heating and cooling units 12,20, yet are free to vibrate with respect to the beam and port structure.

Suitable AC power is provided to the electric motor units 38,38' of the vibratory units 35,36 from a conventional AC utility power line. Switching of the power is controlled by power control means 49 which may be a conventional switchgear for controlling energization of the electric motor units 38,38' of either or both of vibratory units 35,36.

Heating chamber 17 is configured for controlling the amount of oxygen contained therein, being substantially closed to prevent combustion air from being supplied thereto. For this purpose, supply chute 15 may, as illustrated, be provided with a valve control 51 for closing off the airway through chute 15 to prevent air from entering the heating chamber, there being a similar control 51' for closing chute 23.

During heating of materials within chamber 17, volatile components of organic materials supplied through chute 15 are released by the heat supplied to the heating chamber by combustion within combustion chamber 14. Such volatile components are extracted as hot off-gases by a conduit 52 which may be noted as being connected through a valve 53 to a further conduit 54. The latter may communicate with the atmosphere for simply venting the off-gases to atmosphere if such is necessary. But more preferably, conduit 54 is connected to a conventional flare 55 (see FIG. 2), burning any off-gases which might have to be released.

Also connected with conduit 52 is a conduit 57 which permits the volatile components to be directed to a fan 59 (FIG. 2) for pressurizing the off-gases which are then supplied by conduit 60 for being directed through a nozzle 62 into combustion chamber 14. Thus, it will be understood that the off-gases are fuel gases which can be burned within chamber 14 for continued heating of materials within heating chamber 17 in a self-supporting continuous manner.

Figure 2:
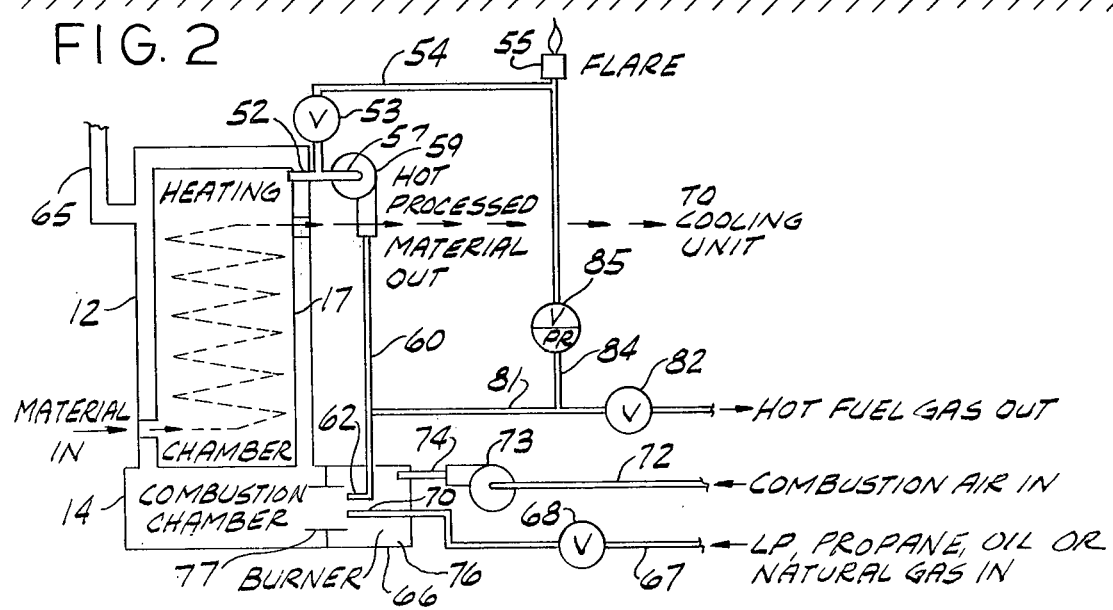
FIG. 2 is a simplified schematic diagram of heating apparatus of the invention including certain gas flow, plumbing and control provisions thereof.

Still referring to FIG. 2, it will be apparent that heating chamber 17 is surrounded by an annular space 64 whereby the hot gases rising from combustion chamber 14 are directed around the periphery of the heating chamber and are then passed through a flue 65 to be released to the atmosphere. Such takes place as materials are fed into chamber 17, travel upward therein, as shown by arrows, for processing and then leave the chamber.

Preferably, a burner 66 of a commercially available type is utilized for providing pressurized air and combustible gaseous fuel to firebox 14. Although the off-gases from chamber 17 are used to support combustion therein, LP, oil, natural propane gas may be used for initial heating purposes or for supplemental heat.

For this purpose a conduit 67 and valve 68 contained therein are used to provide the LP or propane gas through a nozzle 70 of the burner. Air is provided through a conduit 72 to a fan 73 for being supplied under pressure through a further conduit 74 to an airbox 76 of burner 66. The air is then supplied to combustion chamber 14 under pressure through a burner tube 77 surrounding nozzles 62 or 70 and extending into combustion chamber 14. The orientation of nozzles 62 and 70 is representatively shown in FIG. 1 wherein it is seen that nozzle 70 is supported by a bracket 79 extending outwardly from combustion chamber 14.

As will be apparent, the hot fuel gas provided by fan 59 via conduit 60 may be delivered directly by nozzle 62 for being burned in combustion chamber chamber 14. However, certain types of organic materials, when processed according to the invention, create sufficient quantities of low BTU fuel gas that more gas is created than can be effectively burned within combustion chamber 14. Accordingly, there is provided a further conduit 81 connected with conduit 60 which receives the pressurized, hot fuel gas from the top of heating chamber 17. Conduit 81 includes a valve 82 which may be open to deliver at least a portion of the hot fuel gas for further processing, such as by being burned for heating in an auxiliary apparatus, being condensed for storage, or for treatment to remove certain components therein before being used for other purposes. Connecting conduit 81 and flare 55 is a further conduit 84, including a pressure relief valve 85 adapted to open in the event of unusual or excessive pressure in conduit 81 to provide communication between conduit 81 and flare 55. Dependent upon the type of organic material heated within chamber 17, various low or high BTU fuel gases may be constituted by the off-gases released during volatilization of constituents of the organic materials being heated. Where the material is constituted by wood or various other cellulosic or lignocellulosic, there are various pyroligneous gases which are released during heating of the material, including methanes, aldehydes, formic acid, formaldehydes, as well as various other condensible and noncondensible gases of many different kinds, including ethylene, propylene, butylene, not to mention carbon dioxide and monoxide, hydrogen and other compositions and fractions.

Additionally, in the heating of wood and various other organic materials, water vapor is present in the off-gases and such can be readily condensed or separated from the gaseous stream.

Figure 3:
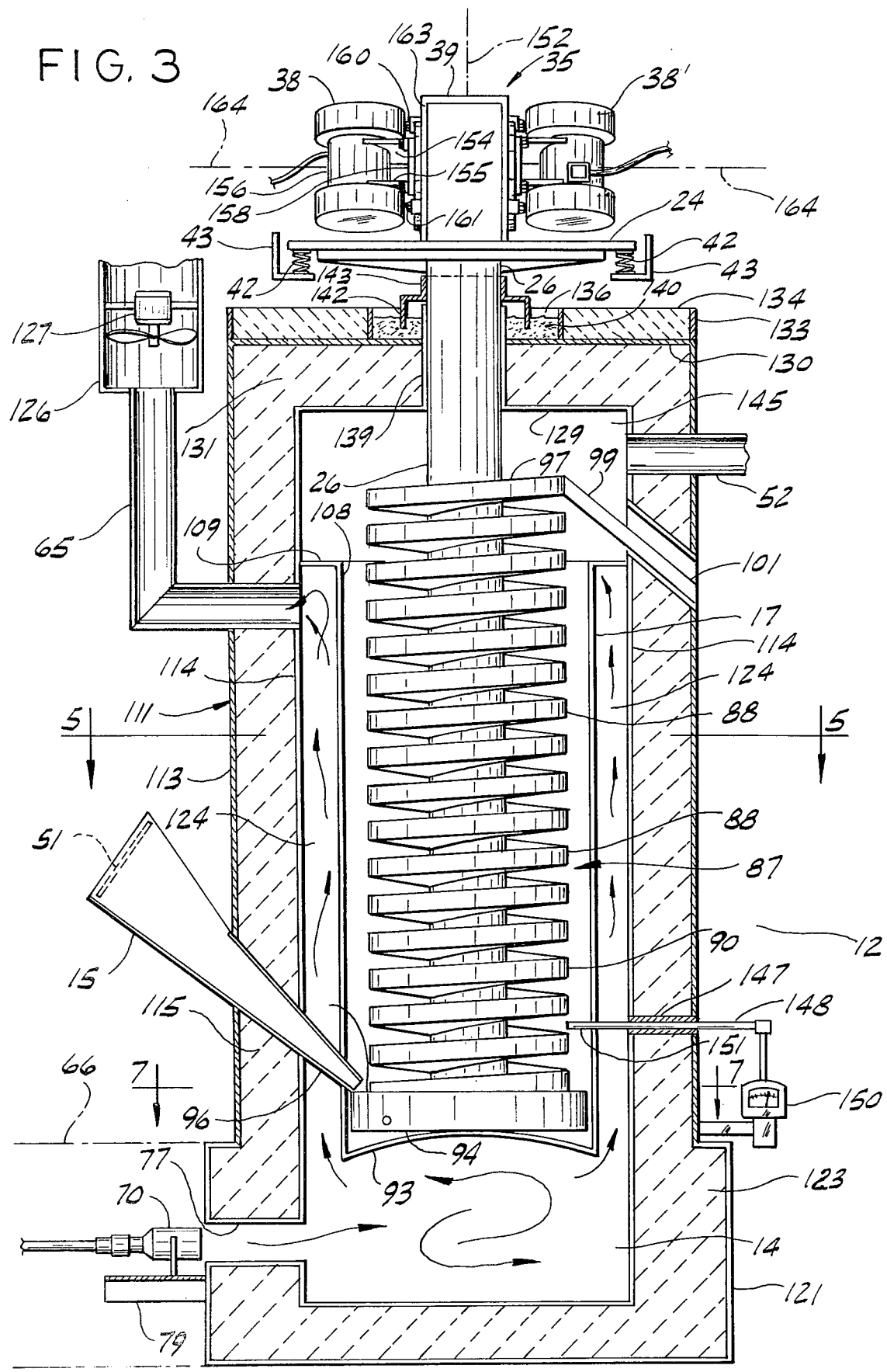
FIG. 3 is a simplified cross-sectional illustration of a heating apparatus of the invention being taken generally in the form of a vertical cross-section through the heating portions of the system of FIG. 1.

Reference is directed now to FIG. 3, illustrating details of heating unit 12 and the vibratory conveyor arrangement provided therein. More specifically, there is provided within heating chamber 17 a spiral vibratory conveyor indicated generally at 87. Said conveyor has a plurality of turns or pitches 88 constituted by a continuous spiral tray 90 which may be of steel, various alloys, or more preferably, a stainless steel. Said tray 90 is lipped around its outer edges as indicated at 91, the entire tray 90 spiraling around and being secured to column 26 which, from reference to FIG. 6, may be seen to be of hollow cylindrical form and constituting a continuous length of material extending downwardly from the flange 29 which is secured to the lower side of platform 24 and upon which vibratory unit 35 is mounted. Said column 26 extends downwardly throughout the vertical extent of heating chamber 17 but does not contact the bottom wall or floor 93 of the heating chamber. At the lower end of spiral conveyor 87, an enlarged diameter tray 94 is provided, being secured to the bottom end of the column 26. Supply chute 15 is provided with a tapered configuration, having an end 96 within heating chamber 17 which extends over a lip 97 of the enlarged diameter bottom tray 94 for causing material to be supplied to said tray, it being apparent that spiral tray 88 spirals upwardly from the bottom tray 94.

Similarly, an uppermost turn or pitch 97 of tray 90 communicates with an inner end 99 of a chute 101 which in turn communicates with transfer chute 18, there being for this purpose (see FIG. 1) a housing 102 at the upper end of the outer surface of heating unit 12 and a further housing 103 extending outwardly therefrom and to which is connected transfer chute 18. Said housing 103 may preferably be provided with a viewing window 105 for observation of heated materials being delivered to transfer chute 18 and including at its upper end a trap door or hatch 106 permitting sampling of materials which flow from chute 101 into housing 103 for testing and measuring purposes.

In a practical embodiment of the apparatus, spiral tray 90 is constituted by approximately twenty-two turns, the spiral tray being pitched at approximately seven degrees and with the approximate diameter of the tray being of the order of 2.5 feet and with the diameter of column 26 being approximately one foot. Assuming a diameter of the tray as being 2.5 feet, a total length of the tray 90 from the bottom of the top along the spiral path constituted by the tray provides an effective conveying distance of approximately 173 feet from the bottom to the top of the spiral tray, as measured along the length of a continuous path proximate the other periphery of the tray. Moreover, the diameter of heating chamber 17 is relatively compact, being approximately 38 inches in a practical embodiment of the invention and with the total height of the spiral tray section of the conveyor being only slightly greater than six feet. In such embodiment, the lip 91 around the outer periphery of spiral tray 88 is approximately two inches. Accordingly, a most compact apparatus is achieved but providing in such compact space an extraordinarily long process length for movement of materials which are delivered to the conveyor 87 by supply chute 15 and which are discharged from the conveyor by chute 101.

Heating chamber 17 is seen to be of a cylindrical form having a vertical side wall 108 and being fully closed at the bottom by the floor 93 of the chamber which, to prevent distortion, is convex configuration. Extending radially outwardly around the periphery of side wall 108 is a peripheral flange 109 which secures the side wall 108 with floor 93, as an integral unit 110, concentrically within a cylindrical refractory housing designated generally 111. Said housing 111 is defined by a cylindrical outer wall 113 which is preferably of steel and a concentric inner wall 114, which may be of steel or stainless steel and with there being suitable refractory material 115 therebetween.

Said inner wall 114 extends vertically upward from a planar, horizontal plate 117 forming the floor of combustion chamber 14, there similarly being a metal plate 118 closing the entire bottom of refractory housing 111 and with there being refractory material 120 located between plates 117 and 118. A cylindrical or retangular outer wall 121 is provided around the exterior of combustion chamber 14, being located a few inches outwardly of outer wall 113 to provide a relatively thicker region 123 of refractory materials surrounding combustion chamber 14.

There is thus seen to be provided surrounding vessel 110 an annular space 124 of a few inches in width between the inner wall 114 of refractory housing 111 and wall 108 of heating vessel 110. Said space is closed at the top by peripheral flange 109 whereby, in effect, the combustion chamber 14 is permitted to communicate with annular space 124 for providing for flow of hot gases from the combustion chamber upwardly and around vessel 110 for thorough heating of materials as they are conveyed by conveyor 87 within vessel 110.

Flue 65 communicates with annular space 124 proximate its upper end whereby hot rising swirling gases from combustion within combustion chamber 14 are drawn upwardly around vessel 110 and out through flue 65. For enhanced draft, flue 65 may communicate with a stack 126 having a fan 127 mounted within the inside diameter (I.D.) of stack 126 for providing a forced draft of the hot combustion gases.

The upper end of refractory housing 111 is closed by a flat, horizontal inner plate 129 such as of steel or stainless steel which, with housing inner wall 114, effectively encloses the upper end of heating vessel 110. A flat, horizontal outer plate 130 extends also across the top of refractory housing 111, being spaced upwardly of plate 129 and with there being refractory material 131 between plates 129 and 130. Outer wall 113 may extend upwardly beyond plate 130 for providing a flange 133 for receiving additional refractory material 134.

A novel arrangement for providing a sealing relationship between the upper end of refractory housing 111 and conveyor column 26 may be noted as including a well 136 constituted by a collar 137 extending upwardly from plate 130 in concentric relationship to column 26 and also by a medal sleeve 139 which closely surrounds column 26 and extends between plates 129 and 130 and upwardly beyond plate 30. Provided in said well 136 is a bed of sand 140. Extending downwardly in said sand 140 is a depending flange 142 which is an extension of a collar 143 which is clampingly engaged to the periphery of column 26. Accordingly, there is provided a relatively gas-tight seal around column 26 for preventing the escape of gases generated within heating vessel 17 around column 26. Said gases are instead drawn off through conduit 52 which extends through refractory housing wall 113 and 114 and communicates with a space 145 at the upper end of the conveyor.

Also extending between the outer wall 113 and inner wall 114 of the refractory housing 147 is a tube 147 in which is extended the probe 148 of a pyrometer or other temperature measuring device 150. Said probe 148 has a temperature measuring tip 151 which extends through a suitable aperture in wall 108 of the heating vessel and which is located between two turns or pitches 88 of spiral tray 87 for accurate measurement of temperatures within heating vessel 17. Although it is preferred that at least one such temperature measuring device 150 be located as illustrated in FIG. 3, additional temperature measuring devices similarly may be installed at locations upwardly along the vertical extent of conveyor 87 for measurement of temperatures at various locations along its length.

The conveyor arrangements for both the heating unit 12 and cooling unit 20 are substantially identical. Accordingly, the description of the conveyor 87 within heating vessel 17 suffices for explaining a substantially identical conveyor arrangement within cooling chamber 21. Similarly, vibrator units 35, 36, being identical, are each described by reference to vibrator unit 35 which is located atop heating unit 12. Thus, referring still to FIG. 3, support structure 39 simply comprises a rectangular box-like or rectangular welded unit which is located directly above column 26 so that the support 39 is esentially coaxial with the longitudinal axis or center line of column 26, as illustrated by reference numeral 152.

Electric motor units 38,38' are simply vibration generators of the motor-weight type available commercially from FMC Corporation of Homer City, Pennsylvania, and sold under the registered trademark SYNTRON, being described according to their preferred manner of usage in Spurlin U.S. Pat. No. 3,053,380, which is incorporated herein by reference. Such units employed in a practical experimental embodiment of the present invention are each of two horsepower size. Each such unit includes a pair of legs 154,155 which extend radially outwardly from a cylindrical body portion 156 of the respective unit and which are bolted to a plate 158 which is clampingly engaged by bolt-secured clamp members 160,161 to a respective face 163 of support structure 39 whereby the motor unit simply be rotated on an axis 164 which extends at a right angle to axis 152 and at right angles with respect to it. The rate at which materials may be caused to be conveyed along the length of conveyor tray 90 may be varied by loosening clamps 160,161 and rotating the motor unit by an appropriate amount to vary the rate of vibratory feeding of materials between appropriate minimum and maximum but with the motor units 38,38' being oppositely oriented under any set of circumstances as generally depicted in FIG. 3. As will be apparent, variation of the angles of the motor units 38,38' in the manner described above will directly determine the amount of time during which material can be caused to travel from the bottom to the top of conveyor 87 for being discharged by chute 101. Thus, the motor angles determine the amount of processing time of materials within the heating chamber 17 and, similarly, within the cooling chamber 21.

The actual conveying of the materials is the result of vibratory action about the axis 152 of column 26 by the individual motor units 38,38' acting in cooperation. Thus, the purpose of springs 42 will be seen to permit platform 24 to undergo vibration. Further, the presence of sand 140 in well 136 permits relative movement of column 26, as it undergoes vibration, with respect to the tubular extension 139 which extends between plates 129,130 and without permitting any substantial amount of gas released within heating chamber 17 to be vented around the periphery of column 26 and without permitting air to enter heating chamber 17.

Figure 5:
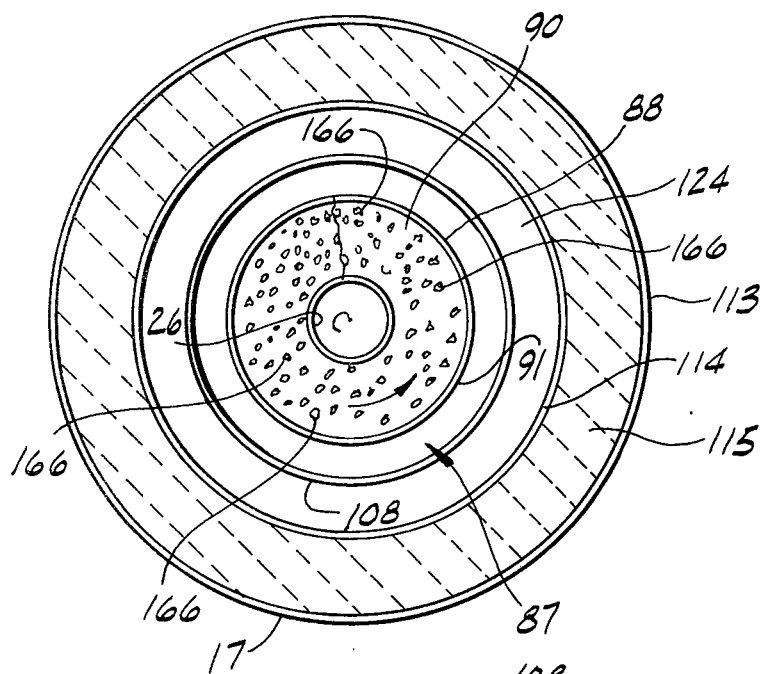
FIG. 5 is a transverse cross-sectional illustration taken along line 5—5 of FIG. 3.
Figure 6:
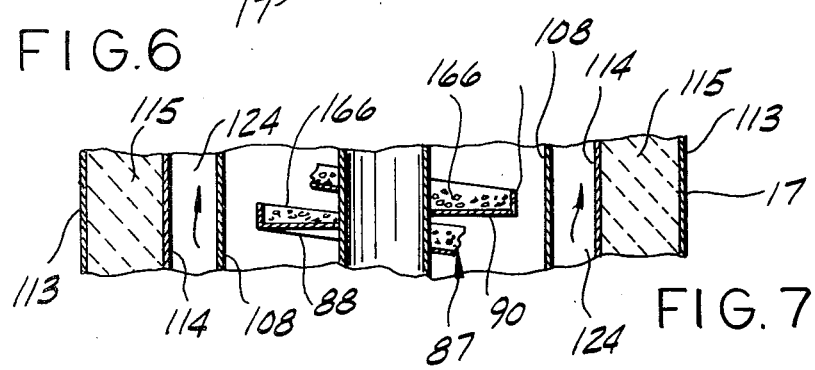
FIG. 6 is a fragmentary vertical cross-sectional illustration of certain vibratory driven conveyor portions of the apparatus of FIGS. 3 and 5.
Figure 8:
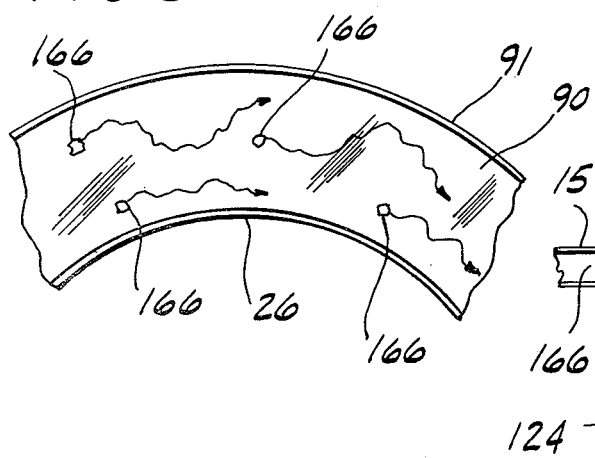
FIG. 8 is an enlarged fragmentary horizontal plan of portions of a conveyor tray of the apparatus of the invention illustrating the movement of pieces of material thereon.
Figure 7:
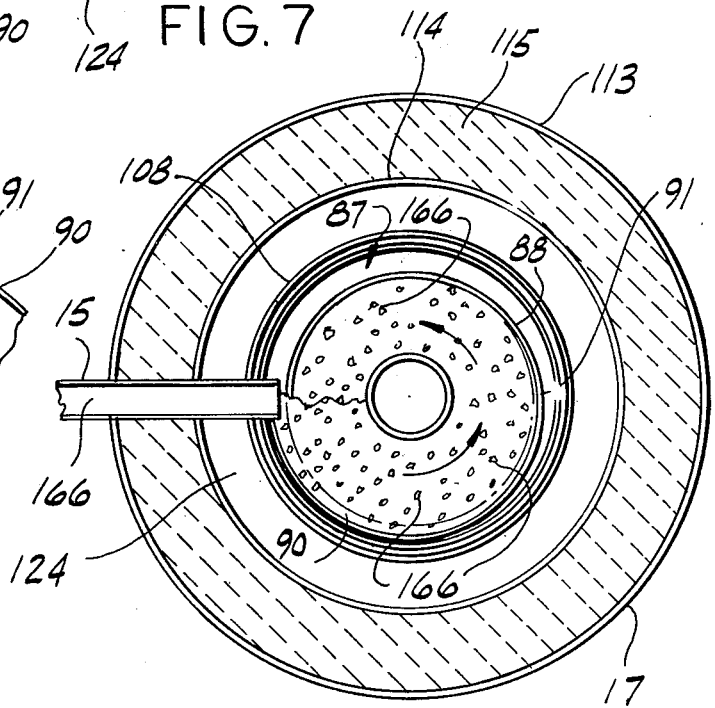
FIG. 7 is a transverse cross-sectional illustration taken along line 7—7 of FIG. 7 and similar to FIG. 5.

The vibratory action imparted to pieces 166 being conveyed by conveyor 87 is illustrated in FIGS. 5-8. The distribution of typical pieces of the material upon a single turn 88 of tray 90 is depicted in FIG. 5 wherein it is seen that the pieces typically are uniformly distributed across the surface of tray 90, there being as much probability that any piece will be as close to column 26 as there is that it will be close to lip 91 of the tray. In FIG. 7, pieces 166' of material entering heating chamber 17 by means of chute 15 are shown to be deposited on the larger diameter bottom tray 97. Through vibratory action conveyed to the pieces by rotation about the axis 152 of column 26, the pieces of material are gradually caused to vibrate upward and along the path of tray 90 until they are distributed uniformly as seen in FIGS. 5 and 6 across the surface of the tray, which is radially normal to axis 152 and, therefore, is horizontal. Due to the vibratory movement imparted to the pieces, they each follow a randam path, as depicted in FIG. 8. Moreover, observation of pieces of material upon the surface of the tray, when the material is in sufficient quantity that there is a layer or thickness of the material at any given point on the tray, is seen to similarly be random in a vertical sense whereby material is constantly being turned over, stirred, and essentially is caused to vibrate so that the same sense of randomized movement of the material occurs in a vertical sense as well as along the arcuate extent of tray 90. Accordingly, material is thoroughly exposed to the heated environment within chamber 17 whereby processing of the material is carried in nondiscrimatory, extraordinarily uniform manner without any of the material being exposed to hot spots or in any other manner permitted to travel along the length of the conveyor in a manner differently from any other piece of material. Consequently, there is an extraordinarily high probability that any given piece of material will have been exposed to precisely the same conditions within heating chamber 17 as any other piece of material undergoing processing. Perforce, the same is true of material being conveyed through cooling chamber 21.

In a practical experimental realization of the present apparatus, it is found that two horsepower motor units 38,38' are adequate to convey 3,000 pounds of material per hour through either the heating unit or cooling unit.

Figure 4:
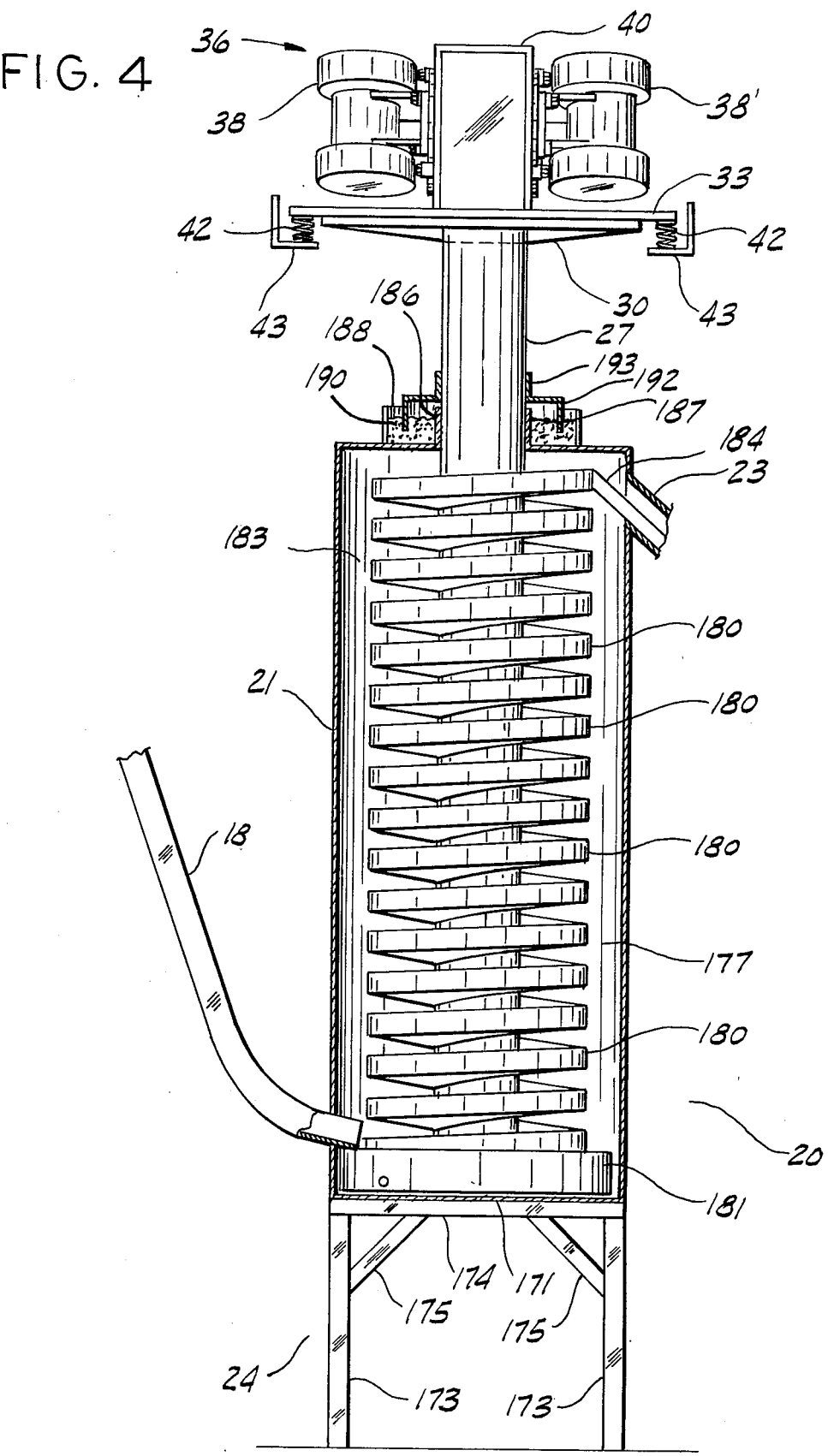
FIG. 4 is a similar cross-sectional illustration of cooling apparatus of the invention.

Reference is directed to FIG. 4 illustrating details of cooling unit 20 and the vibratory conveyor arrangement provided therein. Cooling chamber 21 comprises a cylindrical housing having a vertical wall 168 surrounding the chamber and closed at the top by flat, horizontal upper and lower plates 170,171. Elements 168,170 may be simply of mild steel in sheet form and appropriately welded. Platform 24 comprises preferably four legs 173, as well as horizontal members as indicated at 174 and with bases 175 between the legs and horizontal members. Such structure may be simply formed of angle stock appropriately welded.

A spiral vibratory conveyor indicated generally at 177 is located within the cylindrical cooling chamber 21. The form of conveyor 177 is precisely like conveyor 87 of heating unit 12, similarly having a continuous lipped spiral tray 178 and preferably with the same number of individual turns or pitches 180 as conveyor 87.

Similarly also, there is an enlarged diameter tray 181 which is spaced a small distance above floor 171 of chamber 21 and from which tray 178 spirals upwardly in helical form.

In a practical experimental embodiment of the new apparatus, said conveyor 177 is precisely the same construction as that employed for conveyor 87. Transfer chute 18 delivers materials from heating chamber 17 into tray 181. Said materials are caused to be conveyed upwardly along the length of tray 178, providing a total possible cooling distance which is extremely long even though chamber 21 is relatively compact for permitting materials to be cooled within the enclosed interior 183 of chamber 21 before being delivered by an uppermost turn 180' of the conveyor to an extension 184 of delivery chute 23.

Extending upwardly from the upper end plate 170 is a short collar 186 providing a loose fitting relationship around column 27 in a manner essentially the same as collar 139 around collar 26 of the heating unit. Collar 187 of larger diamter coaxially surrounds collar 186 to provide a well 188 in which is located a bed of sand 190. Extending downwardly into said sand is a depending flange 192 which is an extension of a collar 193 which is clampingly engaged to the periphery of column 27. Such structure provides a gas-tight fluid seal around column 27 for preventing escape of gases within cooling vessel 21 or entry of air around column 27 while permitting vibratory movement of column 27 within collar 186 in response to operation of the motor units 38,38' of vibrator unit 36, which is of construction identical with unit 35 and hence is not described in detail. However, motor units 38,38' may be adjusted in angular relationship in the same manner as those employed in vibrator unit 35 for varying the rate of vibratory feeding of materials along the length of conveyor tray 178, thereby to vary the time during which such materials are conveyed from bottom tray 181 to the upper tray 180' for delivery by chute 23.

In a practical experimental realization of the embodiment, two horsepower motor units 38,38' are employed in vibrator unit 36. In such experimental apparatus, the dimensions of cooling chamber 21 are approximately 3.2 feet in diameter and 6.5 feet in height.

For many uses of the invention, it is found adequate for cooling of materials heated within heating chamber 17 to employ cooling chamber 21 configured as shown in a free standing manner whereby the cooling chamber is effectively air cooled. However, for certain operation of the apparatus wherein extremely high temperatures may be realized within heating chamber 17, it may be preferred to surround cooling chamber 21 with a double walled enclosure through which cooling water may be passed to more effectively transfer heat from cooling chamber 21 for cooling of materials therein. In either event, materials conveyed on spiral conveyor 177 are, in the same manner as the materials on conveyor 88, caused to be randomly moved along the length of the conveyor with the result that each piece of material is uniformly and thoroughly exposed to the cooling environment within volume 183 whereby, as with the heating unit, extremely uniform handling of the materials is possible notwithstanding the extraordinary length of the spiral tray 178. Precisely in the manner occurring in the heating unit, each piece of material exhibits randomized movement both along the horizontal extent of the tray, as well as in the vertical or up and down sense by virtue of the constant agitation of the materials resulting from the vibratory action imparted to them by operation of vibrator unit 40 as imparted to the tray 178 by column 27.

Without intending to limit the numerous possible facets of the invention, methods of processing of various different kinds of organic materials through use of the new apparatus include the conversion of forest products waste, such as sawdust, wood chips, shavings, bark chips and various different forms of lignocellulosic material which is ordinarily the wate product of sawmills, into high quality charcoal having a high percentage of fixed carbon; the conversion of tire scraps into carbon black; the conversion of coal to coke; and the extraction of oil in the form of keragen or bitumen from various oil-bearing shales or sands.

Additionally, various biomass materials, including animal and fowl manure, straw, spent mushroom compost, and various other waste materials such as garbage and the like can be converted into high quality charcoal or gassified.

In the production of charcoal, the overall character of the pieces of starting material are not lost in being processed through the present apparatus in accordance with the teachings of this invention. That is, whether the form of the material be chips, pellets, fragments, grains, particles, dust, shavings, powder, flakes, chunks, or any other form which may be regarded as having a bulk or aggregate character, and all such forms being referred to herein simply as pieces of the respective material, processing of the pieces of material takes place in such a way that the original character of the material is preserved since the pieces of material do not undergo masceration, physical crushing, grinding, and are not exposed to destructive or excessive physical forces while undergoing processing. For example, when starting with wood chips, the invention is utilized to process the wood chips into high carbon charcoal in chip form. However, operation of the apparatus may be conducted under such conditions as to cause the material to be converted into beads or dust. For example, when rubber tire shavings are processed with the invention, the new apparatus causes conversion of the shavings into carbon black advantageously in the form of beads or dust.

Broadly, methodology of the present invention involves the processing of organic material into a more useful state, broadly comprising the steps of enclosing the material in the form of aggregate within a chamber having a vertical extent, it being understood that the present heating and cooling chambers are intended merely to be ilustrative and not to limit the form of chambers in which processing according to the present method can be conducted. Further, the method of the invention includes at least partly closing the chamber to air to control the amount of oxygen contained therein, and conveying the aggregate pieces of material through the vertical extent of the chamber within a predetermined interval of time by continuous vibratory action. As noted, said vibratory action causes agitation of individual ones of the pieces to effect randomized motion thereof and thorough exposure to ambient temperatures within the chamber. Such conveying is carried out while the chamber is heated to a preselected temperature sufficient for converting volatile hydrocarbon constituents of the material to a gaseous state thereby to provide off-gases from the materials. As previously observed, such off-gases are removed from the chamber for their use, being preferably returned by fan 59 and conduit 60 for being burned in combustion chamber to achieve, at least in part, the heating of the heating chamber. In the case of many materials which are capable of being processed in accordance with the invention, sufficient off-gases are achieved that such combustion may be entirely self-supporting while, at the same time, providing for an excess of gas which can be processed for further use, such as for industrial or domestic heating or for cogeneration of electricity, or may be condensed, distilled, cracked, etc.

With the atmosphere in the heating chamber being limited or maintained at least at an atmosphere containing an original amount of oxygen, heating of the chamber to the predetermined elevated temperature therein is, accordin to the new method, sufficient for causing at least partial decomposition of the organic material to produce the requisite volatilization of constituents thereof. Such decomposition effectively converts the material to a higher relative percentage of carbon content as the volatile constituents are liberated, being converted to a gaseous state which is removed from the heating chamber.

According to a preferred continuous process of the invention, the pieces of organic material are continuously supplied by supply chute 15 to heating chamber 17, are conveyed upward therein by the spiral conveyor 87, are continuously transferred by transfer chute 18 to cooling unit 20, and are there cooled in cooling chamber 21 again by being conveyed upwardly through said chamber 21 by spiral conveyor 177 contained therein, being continuously discharged by chute 23.

In carrying out the conversion of various of the foregoing organic materials to charcoal by the new invention, pieces of the material are selected which are broadly in the range from granular through at most a few inches mesh but more preferably from granular through approximately 1½ in. mesh. The bulk or aggregate material, i.e., herein meaning discrete or distinct and individual pieces of a body or mass of the material which will, without use of force, be readily separable from the body or mass, is preferably continuously fed (althrough it may be batch fed) through supply chute into heating chamber 17 with vibratory unit 39 thereof operative and with said heating chamber having been preheated to a predetermined temperature, as measured by device 150; produced by combustion of LP, propane, oil, natural gas, or even alcohol. Regardless of the fuel, it is injected by burner nozzle 70 within combustion chamber 14. The material thus charged to heating chamber is not fed at a greater rate than will produce filling of conveyor tray 90.

Although not shown, a so-called conifer burner may replace burner 66, being suited for burning sawdust, wood chips, bark, husks, etc. Such conifer burners are commercially available and may be operated under conditions for achieving complete combustion of sawdust, for example, without visible stack emissions.

Broadly, the temperature within heating chamber 17 at the location of probe tip 91 between the tray turns 88 may be from about 300° F. to about 2000° F., but more specifically preferred, from about 700° F. to 1600° F. A representative range of operating temperatures for conversion of lignocellulosic materials, such as wood chips, into charcoal is 800°–1200° F. At such temperature at probe tip 151, it is not expected that the temperature differential within chamber 17 will exceed 200° F.-300° F. but it is expected that the temperature at the top of chamber 17 will, in any event, be somewhat less than at the bottom of the chamber, and such is belived desirable since incoming pieces of material are exposed to a greater temperature than exiting pieces of material.

During heating of materials, weight and size is lost as volatilization occurs. Hence, the conveying, or transit, time for travel of pieces from the bottom to the top of conveyor 87 may be less than that for conveyor 177 so that cooling may take a greater time than heating of the material without overfilling or overloading conveyor 177. For this reason, it is desired first to carry out adjustment of motor units 38,38' of vibrator unit 35 so that they are each preset at an angle to provide a conveying or transit time for conveyor 87 within the broadly preferred range of less than approximately 3 min. to as much as approximately 30 min. and, more specifically preferred, within the range of about 5-7 min.

Adjustment of motor units 38,38' of vibrator unit 36 is then preset for a conveying, or transit, time within cooling chamber 21 or broadly within the approximate range of 3-30 min. and, more preferably, the same transit time or more than preset for heating chamber 17. Cooling time may also be predicated upon the temperature of cooled materials delivered by chute 23, assuming that such temperature is measure after the system is operated as a continuous process until thermal stability of equilibrium is attained. In the processing of charcoal, it is preferred that the temperature of the discharged charcoal not be in excess of about 100°-125° F., or simply warm to the touch, but in any event below a temperature at which the resultant charcoal would self-ignite in the atmosphere, or about 150° F. Accordingly, for charcoal processing, heating temperature, heating time and flow rates may be changed appropriately to achieve continuous operation so that the processed material, upon delivery, will not exceed 150° F.

Materials fed by supply chute 15 to heating chamber 17 need not be specifically prepared and, in fact, may be either dry or quite wet but the degree of moisture recognizedly will effect the desired transit time and preferred temperature for processing in chamber 17. For example, dry straw can be readily converted to charcoal at lower temperatures (e.g., about 400°) and short, transit times (e.g., about 3-5 min.) while damp, well rotted sawdust can be readily converted using higher temperatures (e.g., 1000° F.) and longer processing times (e.g., 7 min.).

As used to produce charcoal, the present invention is broadly concerned with pyrolysis or carbonization, with temperatures used being appropriate to the formation of charcoal of grade and quality for the use intended. Charcoal having a high percentage of fixed carbon is readily produced by the invention and of high quality for various industrial uses. But regardless of the use or quality of charcoal to be produced, the invention provides extremely effective and infinitely variable control over process times, temperatures, rates and movement whereby any one of these several parameters can be selectively varied at will to achieve a desired result, in sharp contrast with known, old technology.

Concerning the relationship of the present invention to converting organic materials to charcoal, it is noted that Disclosure Document 076842, entitled "Charcoal Producing Equipment and Method for Producing Charcoal", was filed on behalf of the present inventors on Jan. 2, 1979, continued preservation of said Disclosure Document by the U.S. Patent and Trademark Office being requested.

The present invention also contemplates the gassification of organic materials, rather than converting them to charcoal. Thus, wood and various cellulosic, lignocellulosic, biomass, and organic waste materials, including manure, bagasse, leaves, straw, pits, hulls, shells, and other agricultural and forest and sawmill wastes, such as sawdust, trimmings, cuttings, tailings, etc., as well as coal, can all be gassified by heating to sufficient and appropriate gassification temperatures within heating unit 12, and with only has, coke or mineral residues remaining and being delivered by conveyor 87 via chute 15. The ashes, coke or residues may be cooled, if desired, by cooling unit 20. For gassification, higher temperatures, typically up to 2000° F., but more preferably 1000°-1400° F., may be used in heating chamber 17, while processing times may be of the order of about 5 min. or more, and up to about 20 min., a representative process time being 11 min. Alternatively, lower temperatures with longer processsng times, e.g., up to about 20-30 min., being used.

For gassification, off-gases from heating chamber 17 may be burned in combustion chamber 14 for self-sustaining operation, and the excess gases being provided for further use, e.g., storage, processing, generation of electricity or external heating.

Even when the invention is used for charcoal production, lignocellulosic materials fed to heating chamber, upon heating, provide excess fuel gases. For example, if wood chips having 50% moisture are processed in heating chamber 17 at the rate of 3000 lb./hr., approximately 8 million BTU of off-gas is produced, whereas only about 1-2 million BTU of the gas may necessarily be consumed by burning in combustion chamber. The differences of 6-7 million BTU is recoverable for further use, such being equivalent to about 1.7-2 KWH. The heat value of dry wood may be even greater, and possibly yielding up to more than 20 million BTU at the above-mentioned continuous feed rate of 3000 lb./hr.

Under some circumstances, materials to be converted into charcoal may be of such high moisture content that, prior to heating to carbonization temperatures, drying of the materials is desirable. For this purpose, apparatus of the invention may be configured to provide preheating of materials such as damp sawdust or wood chips prior to exposure to requisite carbonization temperatures at which efficient conversion to charcoal may be rapidly carried out.

FIG. 9 represents such a configuration having a preheating unit 195 including drying chamber 196 for receiving materials to be processed or a chute 198 or other feed means. Chamber 196 may be of construction and dimensions similar or identical to heating chamber 17, including similarly a vibratory conveyor 200 with a spiral (i.e., helical) tray 201 to which vibratory forces are coupled by vibration generator means (not shown) of the same kind as described hereinabove and by which materials are conveyed upwardly (or downwardly) through a vertical extent of chamber 196 in a preselected transit, or processing time, whereupon they are transferred to a transfer chute 203, preferably closed like chute 18, for transferral of the preheated, partly dried materials to heating chamber 17.

Drying chamber 196 is surrounded by a jacket or outer housing 205 to which a flue 206 supplies heated gases arising from combustion chamber 14 of heating unit 12 through space 124 surrounding chamber 17.

Somewhat cooled, these combustion gases flow upwardly around chamber 196 in a space 208, being then withdrawn through a flue 209 to stack 126 by I.D. fan 127. An inlet 211 and outlet 212 permit circulation of drying air through chamber 196. But other venting arrangements are possible, including supplying off-gases from chamber 196 to combustion chamber via burner 16 by use of a fan, etc., in the same way as conduit 57 supplies off-gases to the burner from chamber 17.

For purposes of illustration, cooling unit 20 is shown as having a modified cooling chamber 21' wherein a vibratory conveyor 177' is oriented for conveying material downwardly, rather than upwardly, in response to operation of its vibratory generator (not shown).

Apparatus as shown in FIG. 9 can be used also for the mixing of various materials. Thus, a additive or substance to be mixed with a feed material to be heated can be introduced at point X, whereupon the vibratory action of conveyor 87 will provide rapid, thorough mixing as matter is conveyed upwardly in heating chamber 17. Or, the added matter may be introduced at point Y to the incoming material before drying, whereupon mixing occurs as the material is being preheated in drying chamber 196.

At all times during processing of the various materials, and particularly for conversion of materials to charcoal, and for coking, the presently disclosed process requires at least partly closing the heating chamber 17 and cooling chamber 21 to control the amount of oxygen contained therein. Such control may be achieved by proper operation of controls 51,51' but the use of various forms of known airlocks and dampers is envisioned.

The invention is useful for converting tire scrap into high quality carbon black in the form of beads or powder and thus readily amenable to further use and handling. Broadly, the temperatures used for such conversion may be the same as for charcoal production or somewhat higher, and a specifically preferred range of temperatures being 1000°-1400° F. with a processing or transit time in heating chamber 17 being representatively 7 min. The tire scrap may broadly be in the form of shreds, small pieces or shavings of scrap tires. Off-gases are recovered and are further processed, converted or burned.

Coal may readily be processed by the invention in different ways, such as by being gassified to recover useful volatiles contained therein, at temperatures which broadly may be about 1000°-2000° F., and representatively 1400° F. Representative heating and cooling times may run from 5-30 min. Size of the pieces of coal to be gassified may range from dust to as large as about 3 in. mesh, but preferably 1½ in. or less.

Alternatively, or additionally, coal may be converted to coke of various grades, including grades useful for use in blast furnaces. For this purpose heating temperatures representatively may be from about 1200°-2400° F., to approach liquification of the coal for conversion to pieces having a glassy, essentially crystalline or coral-like state.

The invention encompasses additionally the extraction of volatiles from so-called oil shale and oil sands. Oil shale is a sedimentary rock having a high percentage of volatile matter and fixed carbon which can be extracted as so-called kerogen constituting an olefinic crude oil, there being up to about 50 gal. per ton of shale. Similarly, oil sands contain a tar-like oil termed bitumen which may constitute more than 10 percent by weight and comprising more than 50 percent oil. These various oils are extractable by volatization in heating of the particulate oil-bearing shales or sands in heating chamber 17 at temperatures and process times comparable to those used for gassification or conversion of coal. Even so-called reject oil-bearing shale can be processed with the invention. Broadly, temperatures may range from about 800°-2000° F., with processing times from less than about 3 min. to as much as about 20 min. or more. Representative heating temperature is 1100° F. with heating and cooling being nominally 5 min. each.

Volatile extracted by use of the invention from oil shales and sands are processed in accordance with known techniques, including condensation, fractional distillation and cracking, etc.

It is to be noted that in processing of various organic materials in accordance with the invention, materials ordinarily are heated a single time in heating chamber 17 and subsequently cooled in cooling chamber 21. However, it is envisioned that such materials may be reprocessed one or more times. For example, charcoal having a high, fixed percentage of carbon, e.g., 70 percent or more, can be produced by a single processing of organic material such as wood chips through the new apparatus. Upon a subsequent processing of the converted material, the fixed carbon content can be increased to more than 90 percent, whereby a form of high quality activated charcoal is attained having a high carbon content, and high porosity without substantial structural degradation.

Also, processing of materials by use of the new apparatus can include the use of a plurality of heating chambers or a plurality of cooling chambers, or both. Multiple heating and/or cooling chambers can be in series or parallel or series-parallel combinations. Furthermore, some processing in accordance with the invention may obviate use of the cooling unit 20, as where gassification of certain organics is carried out and where the only processed material remaining after passing through heating unit 12 is hot ash or residue, which may not require controlled or confined cooling.

Although apparatus of the invention is primarily intended for processing of organic materials of the kinds representatively noted, it may be advantageously used for heating, or heating and cooling of various compounds and mixtures and including various inorganic materials. For example, the invention may be useful for heat treating or annealing of various materials, as well as for gaseous treatment or diffusion processes.

Another use of apparatus of the invention is for drying of various materials not only such as said and other minerals but also various crops such as grains, beans, and other crops, for which crops typically drying may be carried out at temperatures of about 50°-300° F. with thoroughness and uniformity resulting from the vibratory handling of materials being dried. Air may be introduced in a preheating or processing chamber of the apparatus to additionally control temperatures. For other materials, drying temperatures may range upwardly from 300° F. to as much as 2000° F.

It is contemplated that two heating units of the invention may each supply heated material to a single cooling unit. In addition, various heating and/or cooling units of the invention can be stacked on the same axis. Further, although both heating unit 12 and cooling unit 20 have been depicted as each constructed for conveying materials from bottom to top, movement may be instead in the reverse direction. For example, as suggested in FIG. 9, material may be conveyed by vibratory action upward in heating unit 12 and downward in cooling unit 20. Additionally, various forms and shapes of chambers for either heating or cooling are possible, including the use of artificial or natural geologic cavities or passages.

The following examples are illustrative of the invention:

EXAMPLE I

The invention is utilized for conversion of oak chips into charcoal. The chips are ¾ in. mesh having approximately 40% moisture content. Apparatus as configured in the drawings is adjusted to provide a heating process or transit time of 7 min., a cooling transit time of 10 min., and a heating temperature of 1200° F. The chips are fed to heating chamber 17 at the rate of about 2000 lb./hr. Shrinkage of the size of the chip pieces is about 33% and chip character is preserved. A charcoal yield of 20-30% results. Upon analysis, dry basis analysis of the charcoal reveals that it comprises:

| | |
|---|---|
| volatiles | 27.7% by wt. |
| ash | 7.6 |
| fixed carbon | 64.7 |
| | 100.00 |

The resultant charcoal is a good briquet grade having a fixed carbon percentage adequate for industrial grade.

EXAMPLE II

The invention is used to convert a mixture of hardwood chips, bark, shavings and sawdust having about 25% moisture. Process times and temperatures as in Example I are used. Dry basis analysis of the charcoal reveals that it comprises:

| | |
|---|---|
| volatiles | 22.1% by wt. |
| ash | 23.0 |
| fixed carbon | 54.9 |
| | 100.00 |

The resultant charcoal is of good briquet quality. Yield is estimated to be 20-30%.

EXAMPLE III

The invention is used to convert oak chips as described in Example I, including some smaller size pieces, into charcoal. The process temperature is 900° F., heating time 7 min., cooling time 10 min. Only the smaller size pieces are found to have been converted to charcoal.

EXAMPLE IV

The following table summarizes conversion of various materials into charcoal under various conditions in accordance with the invention by use of the apparatus and method disclosed herein:

| MATERIAL DESCRIPTION | HEATING TEMPERATURE | HEATING TIME | COOLING TIME |
|---|---|---|---|
| Straw | 400° F. | 7 min. | 7 min. |
| Sawdust | 300 | 30 | 10 |
| Rotten Oak Sawdust (age 25 yr.) | 1000 | 7 | 10 |
| Green Pine Shavings | 1000 | 7 | 10 |
| Green Oak Bark | 1000 | 7 | 10 |
| Green Oak Chips | 1150–1200 | 7 | 10 |
| Green Oak Sawdust and Shavings | 800 | 7 | 10 |
| Green Pine Chips | 1100 | 7 | 10 |
| Chicken Manure | 1100 | 7 | 10 |
| Horse Manure | 1100 | 7 | 10 |
| Oak Chips | 1800 | 5 | 8 |
| Sawdust | 700 | 7 | 10 |
| Sawdust | 1600 | 3 | 5 |

EXAMPLE V

The invention is used to gassify wood. Oak chips having a size of about ¾ in. mesh and moisture content of about 50% are supplied continuously to the heating unit, which is at a temperature of 2000° F. and set to provide a heating and cooling time of 5 min. each. The chips are completely gassified, with only a white ash or ashy residue being discharged by the cooking unit. In other runs at heating temperatures of 1200° F. and 1400° F. and heating times each of 11 min., a similar white ash or ashy residue is discharged by the cooling unit.

EXAMPLE VI

Scrap tires are converted into carbon black by use of the invention. Scrap automotive tire shreds are fed to heating chamber 17 with the temperature therein at 1100° F. and with the heating time and cooling time being 7 and 10 min., respectively. Volatiles of the shredded tire material are completely stripped and drawn off the heating chamber 17 for further treatment. The cooling unit provides carbon black in the form of fine powder and small beads.

EXAMPLE VII

Oil-bearing shale is treated by heating in apparatus configured according to the drawings, as adjusted to maintain a heating temperature of 1100° F., and heating and cooling times of 5 min. each. Two different grades are tested, so-called high quality reject shale and low quality reject shale. For each grade, approximately 16.25 lb. of the shale are processed through the apparatus. For the "high quality reject" shale, approximately 13.25 lb. are recovered from cooling unit 20, and for the "low quality reject," approximately 12.25 lb. In each case, the difference in weight is accounted for by the stripping of volatiles from the shale by heating in heating unit 12.

EXAMPLE VIII

Coal is gassified by roasting out volatiles in apparatus configured as shown, adjusted to maintain a heating temperature of 1400° F., heating time of 5 min. and cooling time of 5-10 min. each. An approximately 10 gal. quantity, weighing about 70 lb., of lumps of size ½-3 in., preferably about 1½ in., mesh coal is charged to heating unit 12. Approximately only 20 lb. of Coke-like pieces or lumps are recovered from cooling unit 20. The different in weight is accounted for by volatilization of constituents of the coal. The recovered pieces may be characterized as porous and coral-like, being relatively light in weight as compared with the coal charged to the heating unit. The heat value of the coal is analyzed and found to be 11,900 BTU/lb. The heat value of the recovered pieces is analyzed and found to be 10,994 BTU/lb.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be secured by Letters Patent is:

1. Apparatus for processing pieces of material by heating, said apparatus comprising means defining a processing chamber configured to control the amount of oxygen contained therein, conveyor means defining an elongated material handling tray comprising a continuous spiral having a vertical extent within said chamber, vibration generating means for imparting vibratory forces to said tray to move pieces upwardly along said tray for being processed by heating within said chamber during movement from a bottom end of said tray to an upper end thereof by vibration, said vibration generating means causing vibratory agitation of said pieces to effect randomized movement thereof, and means for heating said chamber, including a combustion chamber located beneath a bottom of said processing chamber, said randomized movement of said pieces producing through exposure thereof to ambient temperatures within said processing chamber for indiscriminant uniform heating of each of said pieces, said vibration generating means being selectively adjustable to cause movement of said pieces of material to move from the bottom of said tray to the upper end of said tray in a predetermined transit time, said combustion chamber causing the temperature within said processing chamber at the bottom end of said tray to be greater than the temperature within said chamber at the upper end of said tray, whereby said pieces during processing are initially exposed to said greater temperature and thereafter to a lower temperature.

2. Apparatus according to claim 1, said means for imparting vibratory forces to said tray comprising an elongated, vertically oriented column, means resiliently suspending said column within said chamber, and vibration generating means coupled to said column for causing vibratory movement thereof about a longitudinal axis of said column.

3. Apparatus according to claim 2, said chamber having a top, said column extending through an aperture in said top, and means defining a gas seal between said column and top while permitting vibratory movement of said column with respect to said top.

4. Apparatus according to claim 3, said means defining a gas seal comprising members at the top of said chamber forming an annular well surrounding said column, fluent sealing matter in said well, and a flanged sealing member surrounding the periphery of said column and extending into said sealing matter.

5. Apparatus according to claim 1, said means for imparting vibratory forces to said tray comprising an elongated vertically oriented column, means resiliently suspending said column within said chamber, and vibration generating means including at least one vibration motor unit adjustable, coupled to said column for causing vibration about a longitudinal axis of said column, said column extending into said chamber, said vibration generating means being outside of said chamber, and means providing a gas sealing relationship between said column and chamber, said tray being spirally wound as a helix about said column, said tray having a radially horizontal floor, and a lip extending along one edge of said tray radially remote from said column.

6. Apparatus according to claim 1, said processing chamber and combustion chamber being enclosed around the sides by a refractory housing, said refractory housing defining a space surrounding said processing chamber communicating with said combustion chamber whereby heat from said combustion chamber is supplied to the bottom and sides of said processing chamber, said processing chamber being cylindrical and having a nonplanar floor.

7. Apparatus according to claim 1 and further comprising means for removing off-gases from said processing chamber for further use.

8. Apparatus according to claim 2, said vibration generating means including a support having at least one vertical fact, at least one vibration motor unit, clamp means for clampingly engaging said motor unit to said face, said motor unit being adapted for being selectively oriented about a swivel axis angularly with respect to the longitudinal axis of said column and maintained by said clamp means in a preset angular orientation to control the amount of vibratory forces imparted to said tray for causing movement of said pieces of material from one end of said tray to the other in a predetermined transit time.

9. Apparatus according to claim 8, said swivel axis being normal to the longitudinal axis of said column, there being two of said motor units, each being on opposite sides of said longitudinal axis and each being adapted for being selectively oriented about said swivel axis.

10. Apparatus according to claim 1 and further comprising a second processing chamber configured to control the amount of oxygen contained therein, said second chamber being adapted for cooling of material therein, conveyor means defining an elongated material handling tray comprising a continuous spiral having a vertical extent within said second chamber, means for imparting vibratory forces to the last said tray for processing of material in said second chamber by cooling therein during movement from one end of the last said tray to the other end thereof by vibration, and imparting of vibratory forces to the last said tray causing randomized movement of pieces of said material along the last said tray, means for supplying pieces of material to said bottom end of the first said tray for heating in the first said chamber, means for receiving the heated pieces at said other end of the first said tray, means for transferring the heated pieces to one end of the second tray for cooling in said second chamber, and means for receiving the cooled pieces at the other end of said second tray, said means for imparting vibratory forces to each of said trays comprising vibration generator means selectively adjustable for causing movement of said pieces of material on the respective trays to move from one end of the respective tray to the other in a predetermined transit time.

11. Apparatus according to claim 10, the respective means for imparting vibratory forces comprising respective columns resiliently supported within the respective chambers for carrying the respective trays, vibration generating means including at least one vibration motor unit adjustably coupled to each said column, said vibration generating means being located outside of the respective chamber, each said tray being spirally wound as a helix about the respective column.

12. Apparatus for processing pieces of material by heating, said apparatus comprising means defining a processing chamber configured to control the amount of oxygen contained therein, conveyor means defining an elongated material handling tray comprising a continuous spiral having a vertical extent within said chamber, means for imparting vibratory forces to said tray to move pieces along said tray for being processed by heating within said chamber during movement from one end of said tray to the other end thereof by vibration, and means for heating said chamber, said means for heating said processing chamber including a combustion chamber located beneath a bottom of said processing chamber, and further comprising means for removing off-gases including a first fan for drawing said off-gases from said processing chamber, a gas burner for said combustion chamber, means for supplying at least a portion of said off-gases to said burner, and further comprising means for removing off-gases from said processing chamber for further use.

13. Apparatus according to claim 12 and further comprising a second fan for providing forced combustion air to said burner, and means for supplying fuel gas from an independent gas source to said burner.

14. Apparatus according to claim 13 and further comprising means for receiving excess off-gases from said first fan not burned in said combustion chamber, a flare, a pressure relief valve, and conduit means connecting said first fan, said valve, and said flare for permitting burning of said excess off-gases if a predetermined gas pressure is exceeded causing opening of said valve.

15. Apparatus for processing pieces of material by heating, said apparatus comprising means defining a processing chamber configured to control the amount of oxygen contained therein, conveyor means defining an elongated material handling tray having a vertical extent within said chamber, means for imparting vibratory forces to said tray to move pieces along said tray for being processed by heating within said chamber during movement from one end of said tray to the other end thereof by vibration, and means for heating said chamber, a second processing chamber configured to control the amount of oxygen contained therein, said second chamber being adapted for cooling of material therein, conveyor means defining an elongated material handling tray having a vertical extent within said second chamber, means for imparting vibratory forces to the last said tray for processing of material in said second chamber by cooling therein during movement from one end of the last said tray to the other end thereof by vibration, said imparting of vibratory forces to each of said trays causing randomized movement of pieces of said material along the respective tray, means for supplying pieces of material to one end of the first said tray for heating in the first said chamber, means for receiving the heated pieces at the other end of the first said tray, means for transferring the heated pieces to one end of the second tray for cooling in said second chamber, and means for receiving the cooled pieces at the other end of said second tray, and further a third processing chamber adapted for initially receiving said material for preheating, conveyor means defining an elongated material handling tray having a vertical extent within said third chamber, means for imparting vibratory forces to the last said tray for movement of said material through said third chamber by vibration, said imparting of vibratory forces causing randomized movement of pieces along the last said tray while being preheated, means for supplying pieces of said material to one end thereof, means for transferring the preheated pieces from the other end thereof to said one end of the first said tray, and means for transferring heat to said third chamber from said means for heating the first said chamber, whereby materials are preheated in said third chamber before being processed in the first said chamber.

16. A method for processing an organic material into a more useful product comprising the steps of enclosing said organic material in the form of aggregate pieces within a processing chamber having a vertical extent, at least partly closing said chamber to air to control the amount of oxygen contained therein, conveying said pieces through said chamber and along said vertical extent by vibratory action while heating said chamber to a preselected temperature sufficient for converting volatile constituents of said material to a gaseous state thereby to provide off-gases from said material, removing said off-gases from said chamber for further use, and burning at least a portion of said off-gases for causing heating of said chamber.

17. A method according to claim 16 wherein the step of at least partly closing said chamber includes at least initially providing within said chamber an atmosphere containing oxygen.

18. A method according to claim 17 including closing said chamber to the atmosphere outside of said chamber while supplying pieces of said material to said chamber through a small opening therein.

19. A method according to claim 16 wherein said heating of said processing chamber is carried out by burning gases beneath said processing chamber.

20. A method according to claim 10 wherein said heating said processing chamber is carried out also by passing hot gases around said processing chamber.

21. A method according to claim 20 wherein said heating of said processing chamber is at least initially carried out by burning fuel beneath said processing chamber from an independent fuel source.

22. A method according to claim 16 wherein said conveying of pieces is carried out by continuous vibratory action for causing pieces of material to travel through said processing chamber in a predetermined interval of time, said vibratory action causes individual ones of said pieces of material while being conveyed to undergo randomized motion for indiscriminant, uniform exposure of each of said pieces to ambient temperatures within said chamber.

23. A method according to claim 22 and further comprising providing a second chamber adapted for cooling of said material, including transferring pieces of said material to said second chamber following heating of said pieces in said processing chamber, and conveying said pieces through said second chamber along a vertical extent thereof by continuous vibratory action for causing pieces of material to travel through said second chamber in a predetermined further interval of time.

24. A method according to claim 23 wherein the vibratory action used for conveying pieces in each of said chambers causes individual ones of said pieces of material to undergo randomized motion for indiscriminant, uniform exposure of each of said pieces to ambient temperatures within said saecond chamber, the conveying of said pieces of material through each of said chambers being carried out by causing each of said pieces to follow a spiral path in each chamber, said spiral path traversing a vertical extent in the respective chamber.

25. A method according to claim 16 wherein said exposure of pieces of said material to heating in said chamber causes volatilization of constituents of said material.

26. A method according to claim 25 wherein said exposure of pieces of said material to heating in said chamber causes conversion of material to a higher relative percentage of carbon content.

27. A method according to claim 26 wherein said exposure of pieces of said material to heating in said chamber causes conversion of said material to charcoal.

28. A method according to claim 27 wherein said predetermined temperature being within the range of from about 300° F. to about 2000° F.

29. A method for processing an organic material into charcoal comprising heating a processing chamber having lower and upper ends for causing within said chamber at said lower end a preselected temperature greater than a further temperature within said chamber at the upper end, at least partly closing said chamber to air to control the amount of oxygen contained therein, feeding said organic material in the form of aggregate pieces into said chamber at said lower end, conveying said pieces upward in said chamber by continuous vibratory action along a spiral path for causing said pieces of material to travel along said path in said chamber in a predetermined unterval of time, said vibratory action causes individual one of said pieces of material while being conveyed to undergo randomized motion for indiscriminant, uniform exposure of each of said pieces to ambient temperatures within said chambers, said preselected temperature being sufficient for converting volatile constituents of said material to a gaseous state thereby to convert said material to charcoal and provide off-gases from said material during conversion thereof to charcoal, transferring the material from the upper end of said chamber for cooling, and removing said off-gases from said chamber for further use.

30. A method according to claim 27 or 29 wherein said predetermined temperature is within the range of from about 700° F. to 1600° F.

31. A method according to claim 27 or 29 wherein said predetermined temperature is within the range of from 800° F. to 1200° F.

32. A method according to claim 27 or 29 wherein said vibratory action is continuously applied for conveying pieces of said material through said chamber within a predetermined interval of heating time.

33. A method according to claim 32 wherein said predetermined time is from approximately 3 min. to approximately 30 min.

34. A method according to claim 32 wherein said predetermined time is within the range of about 5-7 min.

35. A method according to claim 27 or 29 wherein said material is selected from the group consisting of cellulosic, lignocellulosic, biomass and organic waste materials.

36. A method according to claim 31 further comprising providing a second chamber adapted for cooling of said material, including transferring pieces of said material to said second chamber following heating of said pieces in said processing chamber, and conveying said pieces through said second chamber along a vertical extent thereof by continuous vibratory action for causing said pieces to travel therethrough in a predetermined further interval of cooling time for being cooled to an exit temperature.

37. A method according to claim 36 wherein said predetermined further interval is from approximately 3 min. to approximately 30 min.

38. A method according to claim 37 wherein said predetermined further interval of cooling time is the same as the predetermined interval of heating time.

39. A method according to claim 36 wherein said exit temperature is less than 150° F.

40. A method according to claim 25 wherein said exposure of pieces of material to heating in said chamber causes gassification of said material.

41. A method according to claim 40 wherein said predetermined temperature is within the range of from 1000° F. to about 2000° F.

42. A method according to claim 41 wherein said predetermined temperature is within the range of from 1000° F. to 1400° F.

43. A method according to claim 25 wherein said material is coal, said exposure of said pieces of coal to heating in said chamber causing conversion thereof to coke.

44. A method according to claim 43 wherein said predetermined temperature is within the range from 1000° F. to about 2400° F.

45. A method according to claim 25 wherein said material is constituted by pieces of tire scrap, said exposure of said pieces of tire scrap to heating of said chamber causing conversion thereof to carbon black.

46. A method according to claim 45 wherein said predetermined temperature is from 1000°-1400° F.

47. A method according to claim 25 wherein said material is selected from the group consisting of oil-bearing shales and oil-bearing sands, said exposure of said pieces of material to heating in said chamber causing volatilization of oils from said material in the form of said off-gases, and further comprising recovering the volatilized oils from said off-gases.

48. A method according to claim 47 wherein said predetermined temperature is within the range of about 800°-2000° F.

49. A method according to claim 25 wherein said vibratory action is continuously applied for conveying pieces of said material through said chamber within a predetermined interval of heating time within the range of from approximately 3 min. to approximately 30 min.

50. A method according to claim 29 and further comprising burning at least a portion of said off-gases for causing heating of said chamber.

51. A method according to claim 29, said chamber having side walls, and wherein said material is conveyed upwardly in said chamber spaced from said side walls, said heating of said chamber being carried out by burning gases beneath said chamber.

* * * * *

UNITED STATES PATENT AND TRADEMARK OFFICE
CERTIFICATE OF CORRECTION

PATENT NO. : 4,255,129
DATED : March 10, 1981
INVENTOR(S) : Roger D. Reed et al.

It is certified that error appears in the above—identified patent and that said Letters Patent is hereby corrected as shown below:

Column 19, claim 1, line 31, "through" should read -thorough -.

Column 21, claim 15, line 64, "further" should be deleted.

Signed and Sealed this

Seventh Day of July 1981

[SEAL]

Attest:

RENE D. TEGTMEYER

*Attesting Officer*   *Acting Commissioner of Patents and Trademarks*